United States Patent
Hoffsommer

(10) Patent No.: US 6,326,886 B1
(45) Date of Patent: Dec. 4, 2001

(54) ULTRASOUND DISTANCE MEASURING SYSTEM WITH DIGITAL MEASURING SIGNALS TRANSMITTED BY TIME MULTIPLEXING

(75) Inventor: Klaus Hoffsommer, Bietigheim (DE)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 0 days.

(21) Appl. No.: 09/367,765

(22) PCT Filed: Feb. 13, 1998

(86) PCT No.: PCT/EP98/00807

§ 371 Date: Aug. 19, 1999

§ 102(e) Date: Aug. 19, 1999

(87) PCT Pub. No.: WO98/38529

PCT Pub. Date: Sep. 3, 1998

(30) Foreign Application Priority Data

Feb. 26, 1997 (DE) .............................................. 197 07 651

(51) Int. Cl.[7] ...................................................... B60Q 1/00
(52) U.S. Cl. ........................ 340/435; 340/436; 340/903; 340/932.2; 367/909; 180/169; 342/70
(58) Field of Search ................................. 340/435, 436, 340/901, 932.2, 903, 904; 367/909; 180/167, 168, 169, 170; 342/70

(56) References Cited

U.S. PATENT DOCUMENTS

| | | | |
|---|---|---|---|
| 4,225,953 | * 9/1980 | Simon et al. | 340/312 |
| 4,467,313 | * 8/1984 | Yoshino et al. | 340/904 |
| 4,512,000 | 4/1985 | Masuko . | |
| 4,612,534 | * 9/1986 | Buehler et al. | 340/505 |
| 4,674,073 | 6/1987 | Naruse . | |
| 4,907,222 | 3/1990 | Slavik . | |
| 4,967,860 | 11/1990 | Kremser . | |
| 5,153,586 | * 10/1992 | Fuller | 340/932.2 |
| 5,184,510 | * 2/1993 | Rossman | 73/290 |
| 5,229,975 | 7/1993 | Truesdell et al. . | |
| 5,272,476 | * 12/1993 | McArthur et al. | 340/870.13 |
| 5,485,176 | * 1/1996 | Ohara et al. | 345/173 |
| 5,663,503 | * 9/1997 | Dam et al. | 73/649 |
| 5,781,108 | * 7/1998 | Jacob et al. | 340/552 |
| 5,923,030 | * 7/1999 | Assard et al. | 250/227.19 |
| 5,954,644 | * 9/1999 | Dettling et al. | 600/322 |

FOREIGN PATENT DOCUMENTS

| | | |
|---|---|---|
| 30 33 990 | 4/1982 | (DE) . |
| 3513270 | * 10/1986 | (DE) . |
| 35 24 753 | 1/1987 | (DE) . |
| 3540704 | * 5/1987 | (DE) . |
| 0045056 | * 7/1981 | (EP) . |
| 0 064 477 | 11/1982 | (EP) . |
| 0 419 399 | 3/1991 | (EP) . |
| WO-99/34233 | * 12/1998 | (WO) . |

OTHER PUBLICATIONS

PCT from German 197 07 651.3 report one page.*
Ultraschallsensoren mit eingebauter Intelligenz. Patrick Lereverend. M&P Mar. 1992. pp. 14 and 15.
Intellizente Sensoren. Hans Walcher, Reinhold Bartosz. Elektronik 23. Nov. 13, 1987. pp. 115–118, 121, 124, 126–128.

* cited by examiner

Primary Examiner—Nina Tong
(74) Attorney, Agent, or Firm—J. Gordon Lewis

(57) ABSTRACT

In a device for distance measurement having at least one electroacoustic transducer for transmitting an ultrasonic signal and subsequently receiving an ultrasonic signal reflected from an object, the transmitted power of the transducer can be varied. In the case of a low transmitted power, the oscillation of the transducer decays more rapidly after the transmission time, with the result that it is possible even very soon to receive echoes without interference from the post-pulse oscillation of the transducer. It is therefore possible to measure even very small distances.

6 Claims, 2 Drawing Sheets

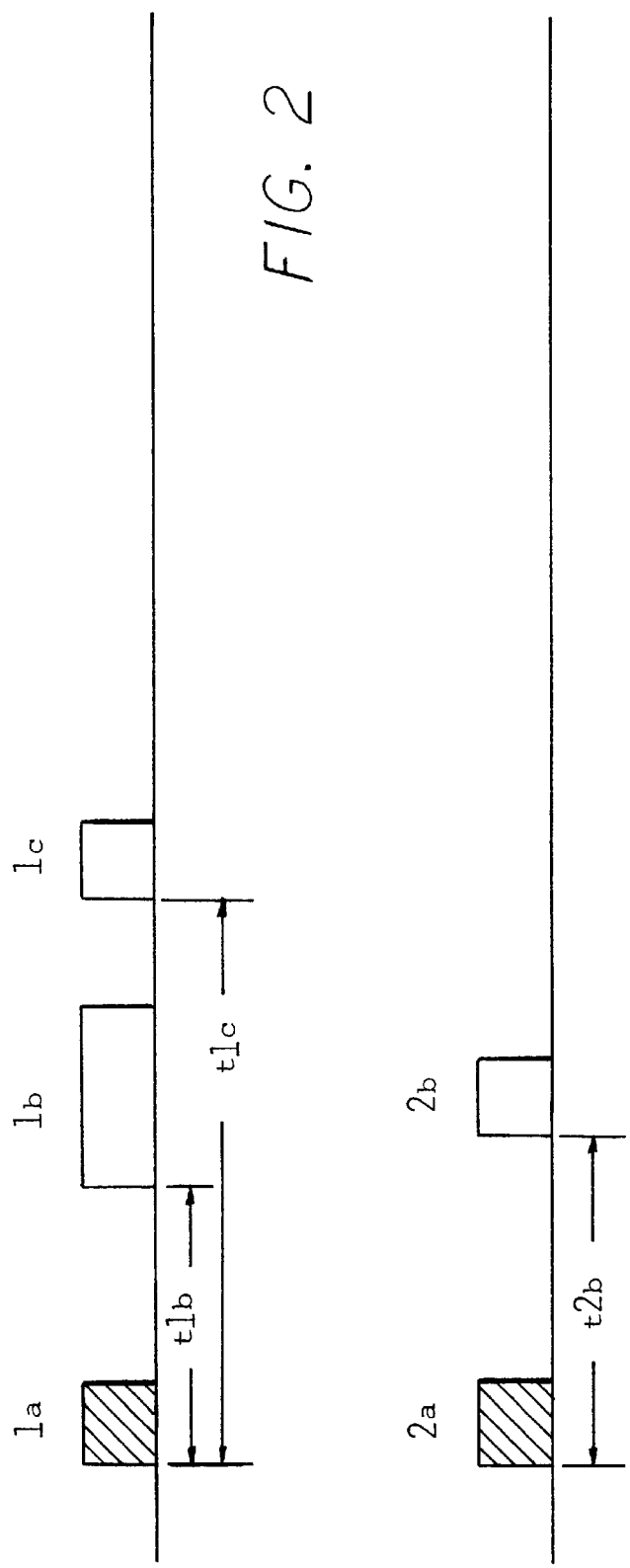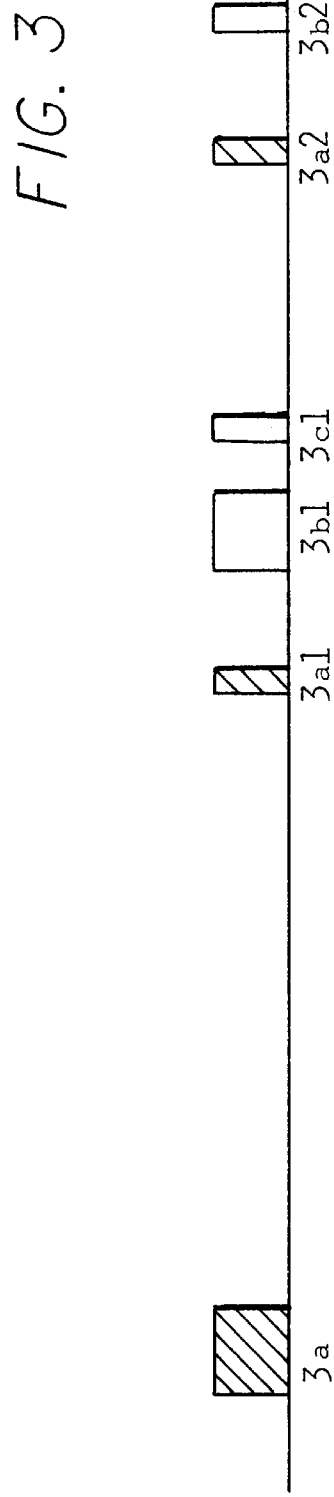

ULTRASOUND DISTANCE MEASURING SYSTEM WITH DIGITAL MEASURING SIGNALS TRANSMITTED BY TIME MULTIPLEXING

BACKGROUND OF THE INVENTION

1. Field of the Invention

The invention pertains to a range measurement system as used, in particular, as a parking aid system in a motor vehicle.

2. Description of the Art

As a vehicle parallel parks, this type of system shows the driver the presence of an obstacle and indicates the distance of this obstacle and its position with respect to the vehicle. The principle of this type of range measurement system is described, for example, in DE-OS 3,540,704. The principle of the method of operation of this type of parking aid system is as follows: an electronic control unit (ECU) is connected to bidirectional data lines that have individual ultrasonic sensors (ULS) which are distributed over the periphery of the vehicle. The individual ultrasonic sensors are controlled as a function of a sequence stored in the electronic control unit (ECU). The ultrasonic sensors then emit a pulse-shaped wave train that is reflected, for example, by means of an existing obstacle. The transmitted waves, are sound waves in the ultrasonic range. When the sound waves are reflected by means of an obstacle, they are then received by means of the ultrasonic sensors, which operate not only as transmitters, but also as receivers. The individual ultrasonic sensor now produce pulses on the data line that correspond chronologically with the received echo, as long as their amplitude exceeds a threshold set in the ultrasonic sensor. With respect to the pulse, the level may be identified as digital, insofar as the existence of a pulse is simultaneously a statement to the effect that the pulse exceeds a certain threshold value (threshold is exceeded or not exceeded). Conversely, the chronological position of the pulse indicates analog information, namely, the range of the obstacle from the receiving ultrasonic sensor. This analog information results from the travel time response of the ultrasonic pulse. Thus, the greater the range to the obstacle, the later the echo arrives at the receiving sensor. The electronic control unit (ECU) computes the distance to the obstacle from the time between the transmission process until the appearance of the reflected wave, keeping in mind the speed of sound.

Parking aid systems of today usually consist of an electronic control unit and, as already explained above, several ultrasonic sensors. Each ultrasonic sensor (ULS) possesses a separate data line, since, in order to improve evaluation, echo information from several ultrasonic sensors is required at a certain instant. Thus, the evaluation of several ULS on the basis of one transmitted sound wave permits more precise conclusions to be made about the position of and the range of the obstacle. It has also already been proposed to arrange the threshold within the ultrasonic sensor so that the exceeding of the threshold triggers the emission of a pulse on the data line. It also is possible to change the threshold within the ultrasonic sensor, such that, for example, several pulses, which are evaluated with changing thresholds, could be emitted in succession from one ultrasonic sensor. In reality, this means that individual echoes are received with differing sensitivity. Also, the sensitivity of a sensor may be changed across the receiving time of a pulse echo, such that certain fixed, preset obstacles such as, for example, a trailer coupling, projecting luggage and the like, may be blanked out. The same applies to reflection from the pavement itself, which appears at a certain range. However, the electronic control unit (ECU) obtains, on the basis of the digital data line, only the information at each instant of whether the amplitude level exceeds the respective threshold or remains below the threshold. As also described, for example, in DE-OS 3,513,270, three states are arranged in succession in the chronological progression of a measurement cycle associated with a single ultrasonic sensor. The ECU produces a short transmission pulse (<1 ms) . Then the receiving ultrasonic sensor transmits the information to the ECU (approximately 10 ms). Finally, a "recovery time" is provided, in which noise echoes and reflections can decay (approximately 10 ms).

SUMMARY OF THE INVENTION

The purpose of the invention is to be able to increase the packing density on the data line, in order to be able to decrease the number of data lines between the sensors and the ECU or to enable improved range measurement. The invention also consists, in principle, of transmitting, instead of one evaluation result by means of one data line, several results by time division multiplex. The multitude of results may result from multiple evaluations of one echo by means of one or more sensors. The echo information measured by the sensors is then buffered and transmitted to the ECU compressed in time. A refinement of the invention enables an advantageous configuration in which instead of connecting the individual sensors point-to-point to the ECU, the sensors are connected to the data line in a serial manner, with each ULS able to transmit to the ECU in a time division multiplex on a common data line. A corresponding use of this data line in the reverse direction toward the ULS, in order, for example, to activate the ULS to transmit a sound pulse, likewise can be provided and is very advantageous.

Since the chronological position of a pulse to be received by the ECU only gives conditional information about the travel time of the echo, it is recommended, in addition to the digital information of the pulse, since this lies above the set threshold, that additional digital information be combined with the pulse which contains information about the travel time of the echo. The travel time of the transmitted pulse from the instant of emission until the instant of reception is always twice as great as the travel time of the reflected echo.

It is possible to transmit a start pulse to the ECU with each cycle, so that the distance of secondary pulse to start pulse corresponds to the travel time of the corresponding echo. In this connection, in a receiving sensor, the echo is simultaneously evaluated with several thresholds (thus several times) . During a cycle, the results to the ECU are chronologically staggered, if necessary, with the results of additional sensors.

The invention results in a multitude of advantages. A transmission of information that is compressed and chronologically staggered allows additional information to be transmitted on a common data line. Consequently, the system can be expanded, for example, insofar as information that concerns the reception of a single echo is transmitted multiple times in order to decrease the susceptibility to faults on the common data line. However, in order to decrease the susceptibility to faults, identical information can also be coded differently, by means of, for example, two transmissions of identical information concerning the same echo, having interchanged levels, with the interchanging of levels occurring on the second transmission.

An additional possibility consists in evaluating the same echo multiple times through the use of different filters, that is, different thresholds on the same echo value. As a consequence, several units of information are available to the ECU for obstacle recognition. Thus, for example, a low threshold value can be used for echoes reflected mainly from the central axis of the transmission beam. However, echoes also may be evaluated with a lower threshold, which are reflected, for example, at an angle to the primary direction of radiation. It is known that an emission at an angle to the primary direction contains less energy, so that the echoes that arrive are also correspondingly weaker. The energy distribution of the transmission level is represented usually as a spatial transmission beam. In this way, information may be gained in several steps on the basis of an analysis of signals received with different thresholds, that is, whether the received pulses are coming from the primary transmitting direction or from a direction at an angle to the primary direction. In this connection, for example, a strategy may be pursued in which an echo received from the primary transmitting direction is blocked out in a second evaluation of the received echo, such that for an equal range, first, the stronger obstacles standing in the primary transmitting direction and then the obstacles standing to the side at a similar range may be detected by means of a single sensor. Corresponding possibilities, which also serve to additionally support the established result, may be achieved by means of a combination of several transmitting sensors, the echoes of which are evaluated simultaneously and, if necessary, multiple times. Thus, the invention is of a great advantage if several sensors are not transmitting on the same information line, but also even if a separate data line exists between each sensor and the ECU, but by means of a time compression, more information may be exchanged by means of this line between the sensor in question and the ECU. Finally, the possibility exists, as a great advantage of the invention, as already further explained above, of connecting several sensors to the ECU by means of one individual data line. This results in a bus system, with a time window allocated to each sensor in which its information is transmitted to the ECU.

As already explained above, it is of particular advantage, to transmit six units of information by means of a sixfold time compression during one cycle. By means of combining the aforementioned possibilities, a system, for example, can be drafted for which two sensors are located on a common data line and, in each case, echo data is transmitted from each of the two sensors from three different thresholds of the same echo.

BRIEF DESCRIPTION OF THE DRAWINGS

One embodiment of the invention is explained in the following with the aid of the drawing in which:

FIG. 2 is a graph showing the progression of a transmitted pulse and the pulses received for a low threshold;

FIG. 3 is a graph showing the progression of a transmitted pulse and the resulting echo pulse for a high threshold; and FIG. 4 is a graph for a system according to the invention showing the progression of the transmitted pulse and the double evaluation of the received pulse for a threshold lowered in steps.

DESCRIPTION OF THE PREFERRED EMBODIMENTS

Figure 1:
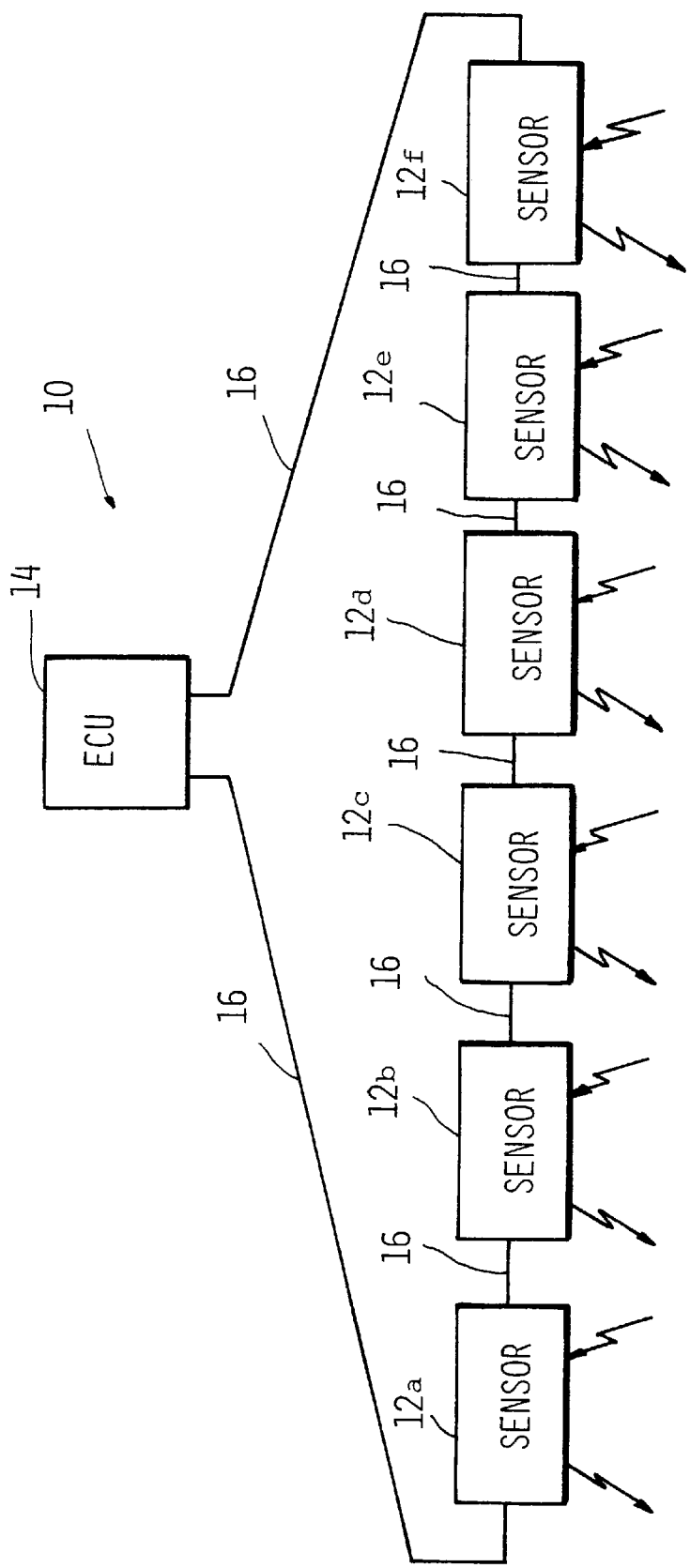
FIG. 1 is a schematic of a range measurement system according the present invention.

FIG. 1 is a schematic of a range measurement system 10 according the present invention. As described above, the range measurement system 10 includes a plurality of ultrasonic wave transmitters or sensors 12a–f, an electronic control unit (ECU) 14, and a data line 16. The ultrasonic sensors 12a–f emit a pulse-shaped wave train that is reflected, for example, by means of an existing obstacle. The transmitted waves, are sound waves in the ultrasonic range. When the sound waves are reflected by means of an obstacle, they are then received by means of the ultrasonic sensors 12a–f, which operate not only as transmitters, but also as receivers. The purpose of the invention is to be able to increase the packing density on the data line 16, in order to be able to decrease the number of data lines between the sensors 12a–f and the ECU 14 or to enable improved range measurement. The invention also consists, in principle, of transmitting, instead of one evaluation result by means of one data line 16, several results by time division multiplex. The multitude of results may result from multiple evaluations of one echo by means of one or more sensors 12a–f. The echo information measured by the sensors 12a–f is then buffered and transmitted to the ECU 14 compressed in time. A refinement of the invention enables an advantageous configuration in which instead of connecting the individual sensors point-to-point to the ECU 14, the sensors 12a–f are connected to the data line 16 in a serial manner as illustrated in FIG. 1, with each sensor 12a–f able to transmit to the ECU 14 in a time division multiplex on the common data line 16.

An important characteristic of the invention also may exist in the fact that without time compression, a double evaluation of the received pulse for an individual transmitted pulse can be enabled by means of the fact that during the third phase (recovery phase), described above, the result of the second evaluation is transmitted in the conventional way. Thus, the recovery phase also is used in the known form to transmit information.

FIG. 2 shows a transmitted pulse (1a), which is formed by means of an ultrasonic wave. This pulse train is reflected in the form of two echoes (1b, 1c). In this connection, it may be deduced, from the duration of the travel time (t1b, t1c), that the obstacle causing the reflection (1b) is located closer than the obstacle belonging to (1c), and the obstacle for (1b) is more elongated than (1c). The method obtained from FIG. 2 is conventional. FIG. 2 shows a transmitted pulse (2a), in the receiving sensor, which also may simultaneously be the transmitting sensor, when the threshold is raised in comparison to FIG. 2. Thus, due to the higher threshold in FIG. 3, the echo (2b) is only above the threshold for a short amount of time. With respect to the obstacle (1c) in FIG. 2, the threshold is so great that this echo is not registered at all, but is suppressed by means of the threshold. By means of the invention, it is possible to employ the method of evaluating an echo with different thresholds obtained from FIGS. 2 and 3 twice on the same transmitted pulse (3a). In this connection, the simultaneous evaluations of the received pulse with different thresholds gives, at one time, two received pulses (3b, 3c) and, at one time, only the shortened received pulse (3b). Then, the results are stored in the relevant sensor and, in a chronological succession, transmitted to the ECU apparatus by means of the data line. Since the information of the travel time, based on the time distance (for example, T1b) of the received pulse (see 1b) is no longer available as an indication of the range of the obstacle, additional information is transmitted, in accordance with FIG. 4, by means of the start pulses (3a1, 3a2). By means of the time distance between the start pulse (3a1 or 3a2) and the subsequent pulses, an indication may be gained of the travel time between the transmitted pulse (3a1) and the received pulses (3b1 or 3c1). In this respect, the time distances between the pulses (3*a*1 or 3*a*2) in comparison to the pulses (3*b*1, 3*c*1 or 3*b*2) also are an analogous measure for the range to the obstacle. The travel times can also be transmitted digitally coded altogether by means of the data line in another form.

What is claimed is:

1. A vehicle parking aid system includes a range measurement system, comprising: a plurality of ultrasonic sensors for emitting ultrasonic waves and receiving reflected ultrasonic waves and an electronic control unit for evaluating the reflected ultrasonic waves received by the plurality of ultrasonic senors, means for digitally storing the reflected ultrasonic waves in the plurality of ultrasonic sensors and digitally transmitting the stored reflected ultrasonic waves in a chronological stagger to the electronic control unit via a data line.

2. The system of claim 1 wherein the reflected ultrasonic waves digitally transmitted from the plurality of ultrasonic sensors to the electronic control unit are coded with information indicating the amount of time elapsed between emission and receipt of each reflected ultrasonic wave.

3. The system of claim 1 wherein the plurality of ultrasonic sensors comprises six ultrasonic sensors and the reflected ultrasonic waves received by the six ultrasonic sensors are transmitted in chronological succession to the electronic control unit via the data line.

4. The system of claim 1 wherein each reflected ultrasonic wave received by the plurality of ultrasonic sensors is evaluated simultaneously with different thresholds and the evaluation results are transmitted in a chronological stagger via the data line to the electronic control unit.

5. A vehicle parking aid system includes a range measurement system, comprising: a plurality of ultrasonic sensors for emitting ultrasonic waves and receiving reflected ultrasonic waves and an electronic control unit for evaluating the reflected ultrasonic waves received by the plurality of ultrasonic senors, means for digitally storing the reflected ultrasonic waves in the plurality of ultrasonic sensors and digitally transmitting the stored reflected ultrasonic waves in a chronological stagger to the electronic control unit via a data line, wherein the plurality of ultrasonic sensors are connected in a serial manner to the data line.

6. A vehicle parking aid system includes a range measurement system, comprising: a plurality of ultrasonic sensors for emitting ultrasonic waves and receiving reflected ultrasonic waves and an electronic control unit for evaluating the reflected ultrasonic waves received by the plurality of ultrasonic senors, means for digitally storing the reflected ultrasonic waves in the plurality of ultrasonic sensors and digitally transmitting the stored reflected ultrasonic waves in a chronological stagger to the electronic control unit via a data line, wherein the plurality of ultrasonic sensors are connected in a serial manner to the data line, and each of the plurality of ultrasonic sensors receives and evaluates simultaneously the same reflected ultrasonic wave with different thresholds with the evaluation results being transmitted in a chronological stagger and a time compression via the data line to the electronic control unit.

* * * * *